US006668050B1

(12) United States Patent
Kurdukar

(10) Patent No.: US 6,668,050 B1
(45) Date of Patent: Dec. 23, 2003

(54) COMMON ACCESS CODE ROUTING USING SUBSCRIBER DIRECTORY NUMBER

(75) Inventor: Prashant Janardhan Kurdukar, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,098

(22) Filed: Sep. 7, 1999

(51) Int. Cl.[7] ............................................... H04M 3/42
(52) U.S. Cl. ............... 379/216.01; 379/45; 379/355.07; 379/355.08
(58) Field of Search ...................... 379/112.09, 216.01, 379/221.15, 355.05, 355.06, 355.07, 355.08, 901, 33, 37, 45

(56) References Cited

U.S. PATENT DOCUMENTS

| | | | | |
|---|---|---|---|---|
| 3,975,595 A | * | 8/1976 | Berube et al. | 379/216.01 |
| 4,757,267 A | * | 7/1988 | Riskin | 379/114.24 |
| 5,136,636 A | * | 8/1992 | Wegrzynowicz | 379/221.01 |
| 5,161,180 A | * | 11/1992 | Chavous | 379/45 |
| 5,291,550 A | * | 3/1994 | Levy et al. | 379/242 |
| 5,422,941 A | * | 6/1995 | Hasenauer et al. | 379/246 |
| 5,465,295 A | * | 11/1995 | Furman | 379/221.14 |
| 5,559,855 A | * | 9/1996 | Dowens et al. | 379/207.11 |
| 5,588,048 A | * | 12/1996 | Neville | 379/127.01 |
| 5,734,698 A | * | 3/1998 | Kobayashi et al. | 379/45 |
| 5,805,688 A | * | 9/1998 | Gillespie et al. | 379/221.08 |
| 5,966,433 A | * | 10/1999 | Courville et al. | 379/201.02 |
| 6,130,935 A | * | 10/2000 | Shaffer et al. | 379/127.03 |
| 6,332,022 B1 | * | 12/2001 | Martinez | 379/220.01 |

* cited by examiner

*Primary Examiner*—Ahmad F. Matar
*Assistant Examiner*—Bing Bui

(57) ABSTRACT

A subscriber dialed common access code, e.g., pqr, such as for directory assistance (411), fire service (611), or voice mail service (222) is translated into a predetermined seven digit number, e.g., tuv-wxyz. All or part of the subscriber's directory number (DN), e.g., abc-defg, is then prefixed and/or suffixed to the translated number to provide a re-constructed number which includes all or part of the subscriber's DN. The re-constructed number takes the form of part/all of [abc-defg] and tuv-wxyz followed by part/all of [abc-defg]. Thus, the re-constructed number incorporates all or part of the subscriber's DN allowing for differentiation among various subscribers who use common access codes permitting each subscriber call to be routed on an individual basis. This permits common access codes to be used by subscribers throughout the network, while routing some subscriber calls differently from others where the same dialed digits are used. In another embodiment, all or part of the caller's DN is combined either as a prefix or suffix with the dialed number for the selective routing of calls to the dialed number on an individual caller basis. This latter approach does not make use of a special access code in making the call.

7 Claims, 2 Drawing Sheets

COMMON ACCESS CODE ROUTING USING SUBSCRIBER DIRECTORY NUMBER

FIELD OF THE INVENTION

This invention relates generally to telephone systems and is particularly directed to the routing of subscriber initiated access code calls in accordance with the subscribing caller's directory number.

BACKGROUND OF THE INVENTION

Special access codes are used in telephone systems to facilitate access to commonly used services. These access codes consist typically of three digits such as 411 for directory assistance, 222 for voice mail service, 911 for emergency services etc. Because most telephone systems serve a large number of subscribers who are spread over a large geographic area, it is frequently necessary to route the access code call of a given subscriber to a particular source of the desired service. Thus, where two subscribers share a common telecommunications switching network, the call of a first subscriber living in a first community will be directed to a first service provider, e.g., a police or fire station, in the first community, while a call for the same service from a second subscriber in a second community will be routed to the corresponding service provider in the second community. There are currently several approaches for routing access code calls in accordance with individual subscriber information.

In Global System for Mobile Phones (GSM) wireless systems, two schemes known as "Calling Party Categories (CPC) based routing" and "MSISDN/IMSI based routing" are used to differentiate subscribers and achieve similar results. In this approach, the entire subscriber base is divided into a series of groups, with each subscriber group referencing a respective table in a digit analysis portion of a computer controlled telecommunications switch. For each service, such as fire or directory assistance, the routing scheme is fixed, i.e., all subscribers in a given group are routed in the same manner. For example, once the network administrator determines that all 979-xxxx subscribers are to be routed in a given way for "fire service," then for any other service such as "hospital," the same 979-xxxx subscribers are routed in the same way. This limits the flexibility of the network administrator in terms of routing subscribers as the network administrator may want to route some subscribers with the 979 prefix in a different manner. In addition, the number of groups in which the subscribers can be classified is generally limited to 126 which further limits call routing flexibility.

Moreover, to accommodate special routing treatment covering different services, it is administratively difficult to create and manage various classes of subscribers, particularly when a new service is added to the network. For example, if there are five fire stations and six hospitals in the network, a total of 30 groups of subscribers would have to be created, such as group one for fire station-1 and hospital-1, group two designating fire station-5 and hospital-3, etc. Once these classes of services are assigned, adding a new service such as for "poison control," with five different poison control centers would require designing additional subscriber groups, possibly as many as 150 (30x5), and redefining of the entire subscriber base. This would also require redefining the digit analysis tables within the telecommunications switch, which again typically is limited to 126 groups.

The problem of differentiating between subscribers can be solved by means of an Intelligent Network (IN). But IN networks are costly and require the transmission of information between the telecommunications switch and an external IN platform.

SUMMARY OF THE INVENTION

This invention is intended for use in a telephone network and contemplates the routing of designated access code telephone calls in accordance with the calling subscriber's directory number (DN). In the telephone network, various services are available to the subscribers by dialing a three digit access code. These services include, but are not limited to, directory assistance (access code 411), police service (911), fire service (611) and voice mail service (222). When an access code is selected by a subscriber for accessing a desired service, a multi-digit translated number is generated corresponding to the three digit access code. The translated number is generated by a switch within the telephone network for proper routing of the call. In some situations, it may be desirable to route a call from one subscriber in a first area to a first service provider and a call from a second subscriber in a second area to a second, different service provider. This invention provides for the selective routing of access code calls on an individual subscriber basis using all or part of the subscriber's DN. Thus, in the present invention all or part of the subscriber's DN is added either to the beginning of the translated number as a prefix or to the end of the translated number as a suffix, or to both the beginning and end of the translated number, to provide a re-constructed number. The re-constructed number thus includes all or part of the subscriber's DN and permits common access codes to be used by subscribers throughout the telephone network, while routing some subscriber calls differently from others where the same dialed digits are used. This invention may also be used without first entering a predetermined access code by adding all or part of the caller's DN to the number dialed either as a prefix or suffix for the selective routing of calls based upon the caller's DN. Thus, the calls to a given number from virtually any number of callers may be routed on an individual caller basis.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF PREFERRED EMBODIMENT

Figure 1:
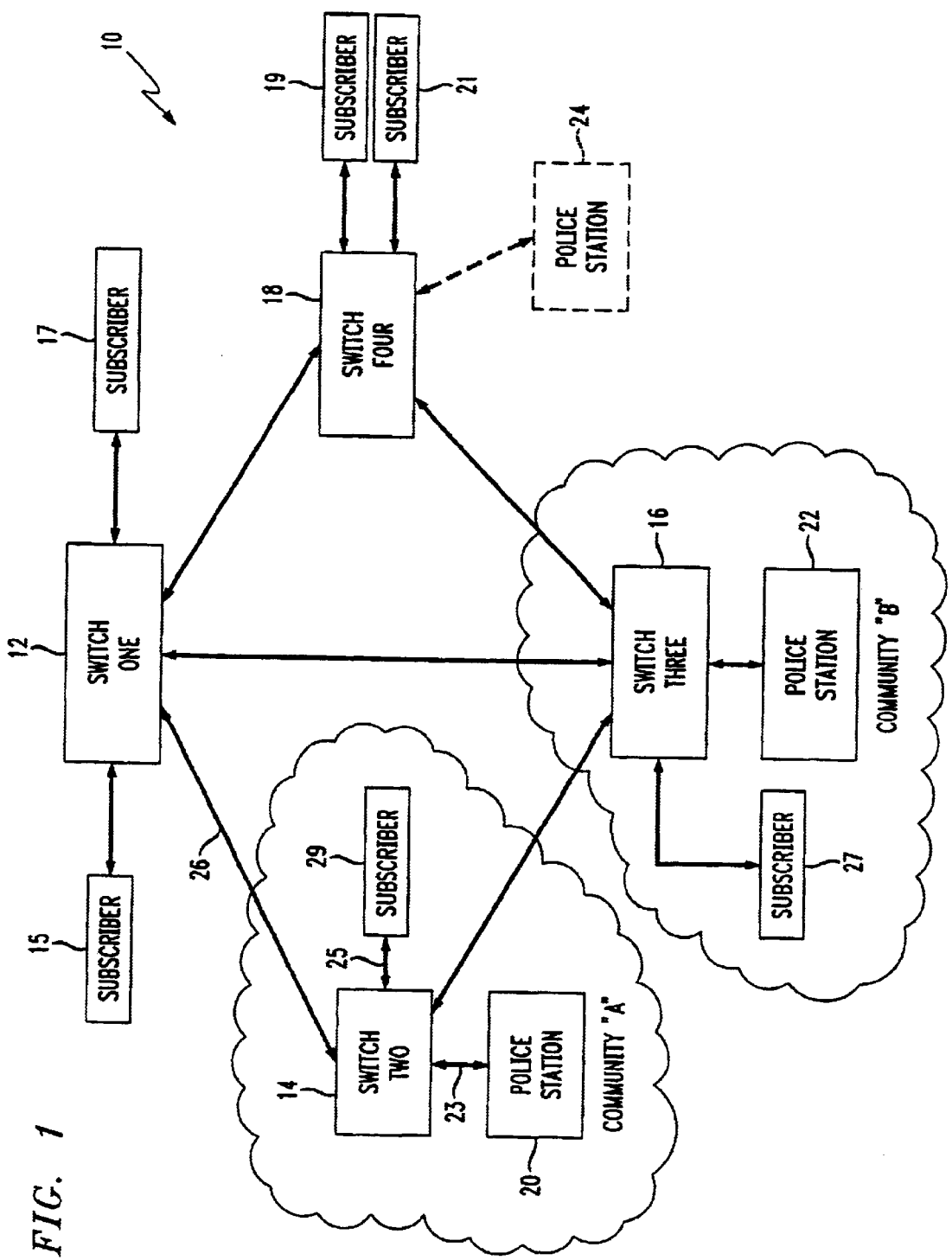
FIG. 1 is a simplified block diagram of a telephone network in which the common access code routing method of the present invention is intended for use.

Referring to FIG. 1, there is shown in block diagram form a telephone network 10 in which the common access code routing method of the present invention is intended for use. The telephone network 10 shown in FIG. 1 is of conventional design and operation and includes a plurality of interconnected switches for the routing of telephone calls.

Thus, the telephone network 10 includes first, second, third and fourth telecommunication switches 12, 14, 16 and 18. An example of a telecommunications switch for use in the telephone network 10 is the 5ESS wireline switch available from Lucent Technologies, Inc. of Holmdel, N.J. Each switch is directly connected to a large number of telephone system subscribers. Thus, directly connected to the first switch 12 are a subscriber 15 and a subscriber 17, while directly connected to the fourth switch 18 are a subscriber 19 and a subscriber 21. Connected to the third switch 16 is a subscriber 27, while connected to the second switch is a subscriber 29. Each switch is connected to one or more adjacent switches by means of a trunk 26, while each subscriber is connected to its associated switch by means of a line 25. As shown in the figure, the second and third switches 14, 16 are respectively located in communities A and B. The second switch 14 is connected to a first police station 20 within community A, while the third switch 16 is connected to a second police station 22 in community B. A call for police assistance, i.e., a 911 call, initiated within community A is routed via the second switch 14 to the first police station 20. Similarly, a call for police assistance initiated in community B is routed via the third switch 16 to the second police station 22.

As shown in FIG. 1, the first and fourth switches 12, 18 are located in neither community A nor community B. The present invention is concerned with the situation where an access code call routed directly to the first switch 12 from either subscriber 15 or subscriber 17 is routed to either the second switch 14 and thence to police station 20 or to the third switch 16 and thence to police station 22. For example, it may be desirable to route a 911 call from subscriber 15 to police station 20, and a 911 call from subscriber 17 to police station 22. The present invention also permits, for example, access code calls to the fourth switch 18 from subscriber 19 to be routed to police station 22 via the third switch 16 and a call from subscriber 21 to be routed to a third police station 24 (shown in dotted line form) via the fourth switch 18. Thus, the access code call routing method of the present invention permits the complete flexibility in the routing of access code calls within telephone network 10. While the present invention is described primarily in terms of the selective routing of access code calls based upon the caller's DN, access code calls may also be routed in accordance with any other number associated with the subscriber, which number may identify a given classification or characteristic of the subscriber such as the subscriber's priority of service, billing rate, type of business, etc.

Figure 2:
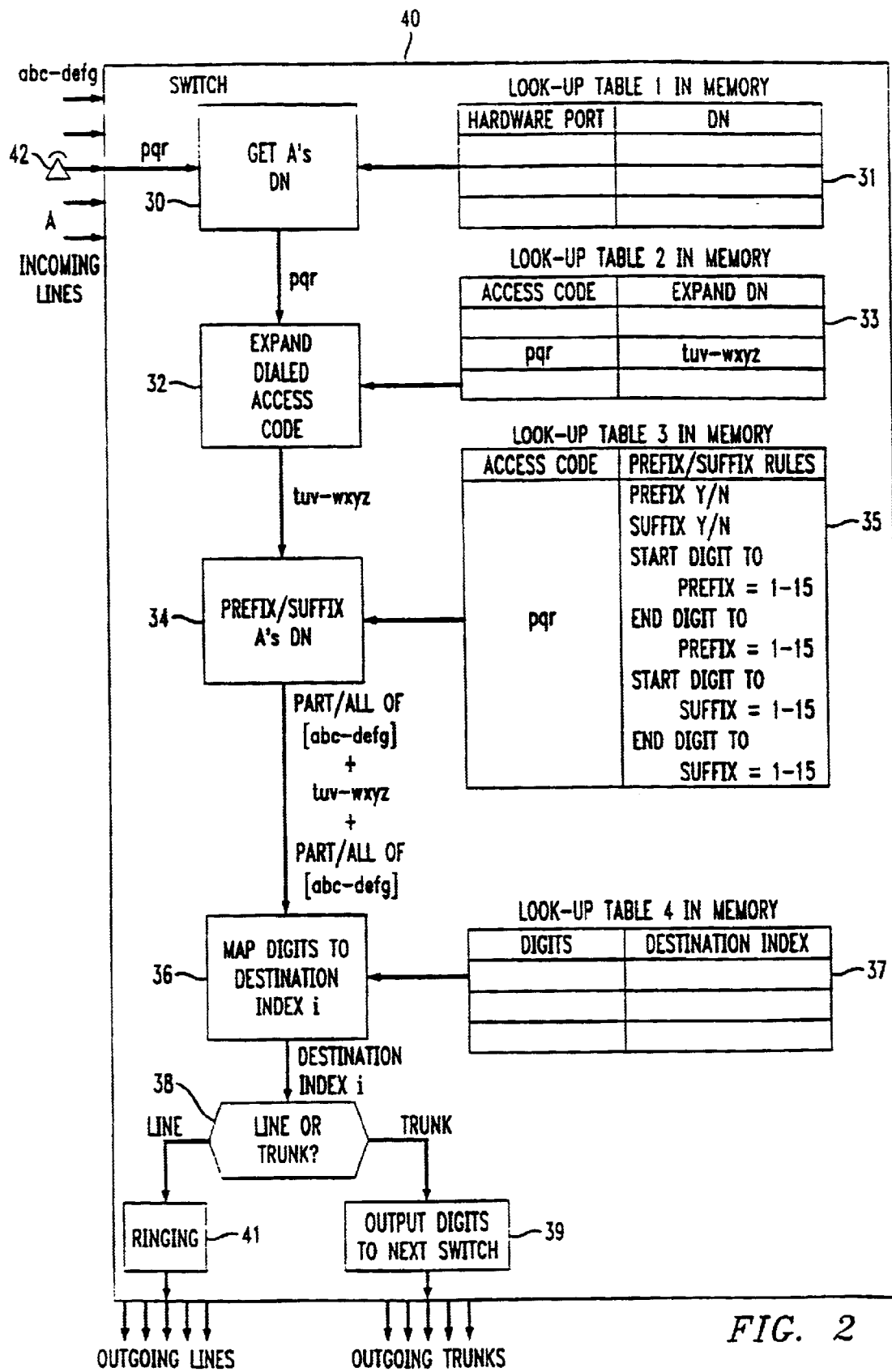
FIG. 2 is a simplified flow chart illustrating the steps involved in carrying out the inventive common access code routing method of the present invention.

Referring to FIG. 2, there is shown a simplified flowchart illustrating the steps involved in carrying out the common access code routing method of the present invention. In FIG. 2, a box represents an action or a look-up table in memory, while an arrow represents the flow of data. A diamond-shaped symbol represents a decision point. The steps carried out in FIG. 2 are performed under the control of a program stored in a microprocessor-controlled telecommunications switch 40. The process is initiated by subscriber A entering a three digit access code "pqr" on a telephone 42. As indicated above, access code pqr may be for directory assistance, fire service, voice mail service, police service, or any other service available on the telephone network by dialing a predetermined access code. The subscriber has an assigned DN of "abc-defg." The dialed access code is provided via a hardware port to the caller's local switch 40, or the switch to which the caller is directly connected, which retrieves the subscriber's DN at step 30 from a first look-up table 31 in memory and expands the access code to a predetermined set of digits at step 32. Steps 30,32 and 34 are involved with the handling of subscriber A. Each switch is programmed in accordance with the desired routing of incoming access code calls to the switch. Thus, the three digit access code pqr is translated into a predetermined number "tuv-wxyz." The translation of the access code to a predetermined number is a conventional operation well known to those skilled in the relevant art and typically involves accessing and reading from a second look-up table 33 in the switch which maps an access code to a particular expanded number. Then, in accordance with the present invention, at step 34 all or part of the subscriber's DN is added either to the beginning of the translated number as a prefix or to the end of the translated number as a suffix, or to both the beginning and end of the translated number. Thus, all or part of abc-defg is added to either the beginning or the end, or both the beginning and end, of the translated number tuv-wxyz by reading a reconstructed number from a third look-up table 35 in memory. The third look-up table 35 maps each access code to a set of rules for prefixing/suffixing part/all of A's DN to the expanded number tuv-wxyz. With the fully re-constructed number incorporating all or part of the subscriber's DN, differentiation between the various subscribers is now possible even though all subscribers dial the same digits of the common access code. Differentiation among the various subscribers permits the access code calls of individual subscribers to be routed in accordance with each subscriber's DN.

At step 36 in the inventive process illustrated in FIG. 2, the re-constructed number undergoes a digit analysis in the switch which maps the digits to a unique destination index i. The destination index i is determined by the subscriber's DN as well as the access code dialed and is read from a fourth look-up table 37 in the switch's memory. Steps 38, 39 and 41 are involved with call routing. These steps map the destination index i to an outgoing trunk or a line. At step 38, the operating program in the switch routes the call in accordance with the destination index i by determining if the call is to go to a line or a trunk. For example, if the final destination of the call is out of the switch, the digits are outpulsed to another switch at step 39 via an outgoing trunk. The digits outpulsed are the fully expanded number (part/all of A's DN+tuv-wxyz +part/all of A's DN). The other switch then analyzes these digits and either terminates to a line or to another trunk. If the final destination of the call is on the switch, the call is routed to a line within the switch network at step 41 and a ringing signal is provided via a line to the intended destination. For example, if an access code call initiated by subscriber 15 is intended for police station 20, the access code is first directed to the first switch 12, which then directs the call via trunk 26 to the second switch 14. Because police station 20 is within the network of the second switch 14, the call is routed by the second switch via a line 23 to police station 20. Similarly, a call initiated by a subscriber in community B will be directed by switch 16 via a line to police station 22.

While this invention has been disclosed in terms of first entering a predetermined call access code, it is not limited to this approach. Thus, the present invention also contemplates combining all or part of the caller's DN either as a prefix or suffix with the number called for the selective routing of calls on an individual subscriber basis. For example, calls to a given number could be automatically routed to one of several extensions or operators at the called number depending on the caller's DN. In this approach, step 32 in FIG. 2 would be omitted from the inventive method.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. In a communications network wherein a plurality of subscribers can access various services by dialing an access code for a given service, and wherein each subscriber has assigned a unique directory number, a method of routing subscriber calls comprising the steps of:

converting a single access code dialed by a given subscriber to a predetermined number;

adding all or a portion of the subscriber's directory number to either the beginning of said predetermined number as a prefix or to the end of said predetermined number as a suffix in directly providing a subscriber-unique destination index; and routing the call in accordance with said subscriber-unique destination index.

2. The method of claim 1 wherein the access code for each service is common to all subscribers.

3. The method of claim 2 further comprising the step of assigning a three digit number to each of said access codes.

4. The method of claim 3 wherein the step of converting said access code to a predetermined number includes converting said three digit number to a seven digit number.

5. The method of claim 4 wherein said subscriber-unique destination index is defined by the combination of said predetermined number and all or a part of the subscriber's directory number.

6. In a communications network wherein a plurality of subscribers can access various services by dialing an access code for a given service, and wherein each subscriber has assigned a unique directory number, a method of routing subscriber calls comprising the steps of:

converting a single access code dialed by a given subscriber to a predetermined number;

adding all or a portion of the subscriber's directory number to either the beginning of said predetermined number as a prefix or to the end of said predetermined number as a suffix in directly providing a subscriber-unique destination index; and routing the call in accordance with said subscriber-unique destination index; and classifying the subscribers by each subscriber's directory number.

7. A method of routing calls in a communications network including a plurality of subscribers each having an individual directory number, wherein the subscribers can access a plurality of services each having an associated three digit access code, said method comprising the steps of:

dialing a single three digit access code of a desired service;

converting said three digit access code to a multi-digit number, wherein the three digit access code for a given service is common for all subscribers and each of said three digit access codes is converted to a respective multi-digit number;

combining the subscriber's directory number and said multi-digit number by adding all or part of the subscriber's directory number either to the beginning of said multi-digit number as a prefix or to the end of said multi-digit number as a suffix to directly provide a subscriber-coded call routing number; and routing the call either within the communications network or out of the communications network in accordance with said subscriber-coded call routing number.

\* \* \* \* \*